United States Patent
Walsh

(10) Patent No.: US 12,084,204 B2
(45) Date of Patent: Sep. 10, 2024

(54) REMOTE DEICING/ANTI-ICING

(71) Applicant: Air T, Inc., Minneapolis, MN (US)

(72) Inventor: Jeffrey C. Walsh, Lake Quivira, KS (US)

(73) Assignee: Air T, Inc., Minneapolis, MN (US)

( * ) Notice: Subject to any disclaimer, the term of this patent is extended or adjusted under 35 U.S.C. 154(b) by 486 days.

(21) Appl. No.: 17/362,372

(22) Filed: Jun. 29, 2021

(65) Prior Publication Data
US 2022/0411105 A1 Dec. 29, 2022

(51) Int. Cl.
| | |
|---|---|
| *B64F 5/20* | (2017.01) |
| *B60K 35/00* | (2024.01) |
| *B60K 35/22* | (2024.01) |
| *B60K 35/28* | (2024.01) |
| *B60R 11/04* | (2006.01) |
| *B64D 15/20* | (2006.01) |

(52) U.S. Cl.
CPC ............... *B64F 5/20* (2017.01); *B60K 35/00* (2013.01); *B60R 11/04* (2013.01); *B64D 15/20* (2013.01); *B60K 35/22* (2024.01); *B60K 35/28* (2024.01); *B60K 2360/176* (2024.01)

(58) Field of Classification Search
CPC ... B64F 5/20; B64F 5/23; B60K 35/00; B60K 2370/152; B60K 2370/176; B60R 11/04; B64D 15/20
See application file for complete search history.

(56) References Cited

U.S. PATENT DOCUMENTS

| | | | | |
|---|---|---|---|---|
| 5,180,122 A | * | 1/1993 | Christian | ................... B64F 5/20 340/905 |
| 6,134,734 A | | 10/2000 | Marrero | |
| 9,110,468 B2 | | 8/2015 | Funke et al. | |
| | | (Continued) | | |

FOREIGN PATENT DOCUMENTS

| | | | | |
|---|---|---|---|---|
| AU | 2020201692 B2 | * | 7/2021 | .............. B25J 11/00 |
| CA | 3117496 A1 | | 10/2019 | |
| | (Continued) | | | |

OTHER PUBLICATIONS

"CN-113459974-A" Translated version (Year: 2021).*
(Continued)

*Primary Examiner* — Navid Z. Mehdizadeh
*Assistant Examiner* — Shelley Marie Osterhout
(74) *Attorney, Agent, or Firm* — Brooks, Cameron & Huebsch, PLLC

(57) ABSTRACT

Devices, systems, and methods for remote deicing/anti-icing of an aircraft are described herein. One remote operator deicing/anti-icing station located in a remote location from a deicing/anti-icing rig includes a number of remote rig control components for actuation by a remote operator, wherein the remote rig control components include a remote operator user interface, located outside of a rig being at least partially controlled by the remote operator deicing/anti-icing station, the rig including a truck and a deicing/anti-icing control cabin that controls disbursement of substances to deice/anti-ice an aircraft, and a communication device that communicates instructions from the remote operator user interface and the number of remote rig control components to the rig to control at least one of the truck and the deicing/anti-icing control cabin.

20 Claims, 7 Drawing Sheets

(56) References Cited

U.S. PATENT DOCUMENTS

| | | | |
|---|---|---|---|
| 2013/0206429 A1* | 8/2013 | Sullivan | A62C 31/28 |
| | | | 169/25 |
| 2014/0152670 A1* | 3/2014 | Yanez | |
| 2016/0075426 A1 | 3/2016 | Rossano et al. | |
| 2017/0037725 A1* | 2/2017 | Uotila | E21B 7/025 |
| 2019/0257656 A1 | 8/2019 | Campbell | |
| 2021/0243466 A1* | 6/2021 | Campbell | |
| 2021/0380280 A1* | 12/2021 | Campbell | B08B 3/08 |
| 2022/0341124 A1* | 10/2022 | Sugiyama | E02F 3/439 |
| 2023/0167711 A1* | 6/2023 | McCarthy | |

FOREIGN PATENT DOCUMENTS

| | | | | |
|---|---|---|---|---|
| CN | 111068213 A | * | 4/2020 | A62C 27/00 |
| CN | 113459974 A | * | 10/2021 | |
| KR | 20190086666 A | * | 10/2017 | B64F 5/23 |
| WO | 1993000261 | | 1/1993 | |

OTHER PUBLICATIONS

"KR-20190086666-A" Translated version (Year: 2017).*
European Patent Application No. 22181754.7 written response from Air T, Inc. Jun. 30, 2023. (Year: 2023).*
CN111068213 Translation of Description (Year: 2020).*
Extended Search Report cited in related EP Application No. 22181754.7 dated Oct. 28, 2022 (11 pages).

* cited by examiner

REMOTE DEICING/ANTI-ICING

TECHNICAL FIELD

The present disclosure relates to devices, systems, and methods for remote deicing/anti-icing.

BACKGROUND

One of the main issues for deicing/anti-icing providers is hiring and retaining employees to operate aircraft deice/anti-icers. Operating an aircraft deice/anti-icer requires specialized training and failure to perform the process correctly could have catastrophic results.

Recently, providers have created deicing/anti-icing vehicles that can be used by one operator. With the single operator function, the operator in the enclosed cabin of the deice/anti-icer controls all deicing/anti-icing functions (boom movement & spray systems) and drives the vehicle. This technology reduced the requirement of having two employees (one in the truck and one in the cabin) for each truck.

Even so, ninety percent of the employees used by deicing/anti-icing providers are "on-call, part time" and are only utilized when required by the weather. This requires these companies to hire and train four to five times the number of employees that will be required to operate the equipment. Failure of employees to come to work when needed can have negative effects on the operation's performance due to under staffing and employee fatigue, among other issues. Further, poor performing employees have also been shown to use significantly more aircraft deicing/anti-icing fluid, resulting in higher cost and environmental impact, have a greater chance of causing costly aircraft damage, and take significantly longer to complete the process.

DETAILED DESCRIPTION

Figure 1:
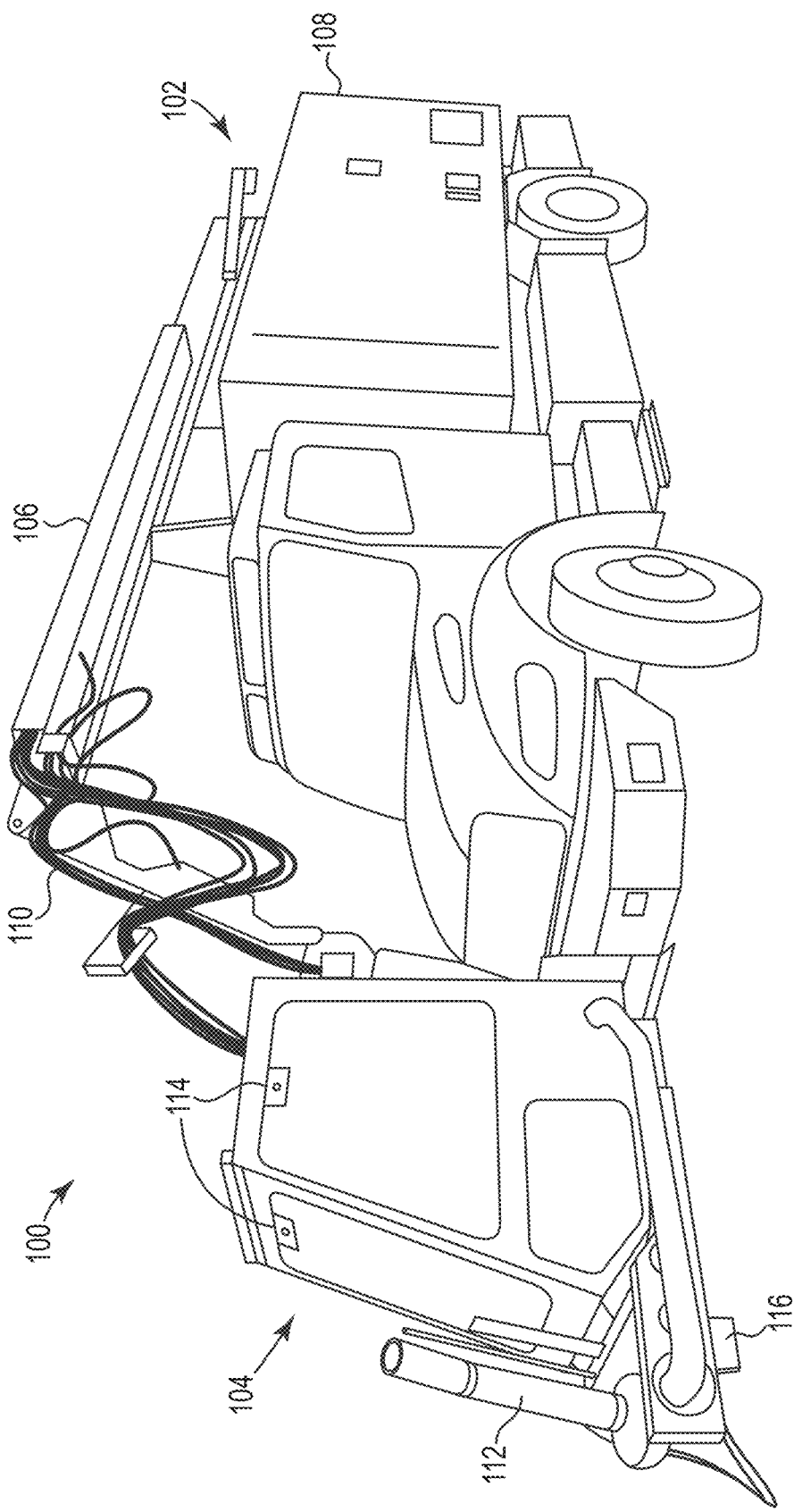
FIG. 1 is an example of a deicing/anti-icing rig used for deicing/anti-icing aircraft, in accordance with one or more embodiments of the present disclosure.

Devices, systems, and methods for remote deicing/anti-icing of an aircraft are described herein. One example of a remote operator deicing/anti-icing station located in a remote location from a deicing/anti-icing rig includes a number of remote rig control components for actuation by a remote operator, wherein the remote rig control components include: a remote operator user interface, located outside of a rig being at least partially controlled by the remote operator deicing/anti-icing station, the rig including a truck and a deicing/anti-icing control cabin that controls disbursement of substances to deice/anti-ice an aircraft, and a communication device that communicates instructions from the remote operator user interface and the number of remote rig control components to the rig to control at least one of the truck and the deicing/anti-icing control cabin.

Embodiments of the present disclosure can include capabilities and features such as: full remote control of truck movement, boom, nozzle, fluid heater, fluid type selection; the remote operator system of the remote operator station can be laid out identically to the enclosed deicing/anti-icing control cabin of the deicing/anti-icing rig; cameras that allow observable location of the truck and/or control cabin; cameras that allow observation of truck and/or control cabin movement; GPS location of deicing/anti-icing rig; emergency stop overrides (local and remote); remote operator chair with identical controls, multiple video screens and touch control panels; ability to restrict access to specified deicing/anti-icing rigs from any remote operator deicing/anti-icing station seat; integration of a telemetry system which can provide data and information about a the rig being controlled and/or a multi-rig deicing/anti-icing operation; and other features and capabilities discussed herein.

An example of how the deicing/anti-icing process can work in accordance to an embodiment disclosed herein includes: having local personnel move deicing/anti-icing rig to/from a deicing/anti-icing pad where the aircraft deicing/anti-icing takes place (e.g., beginning/end of a deicing/anti-icing shift, resupply runs), monitoring on location with a locally present deicing/anti-icing technician that oversees the deicing/anti-icing operation; deicing/anti-icing truck and/or control cabin being physically switched to remote or local (onsite) mode; then, when switched to remote mode, the remote operator controls the truck and/or deicing/anti-icing control cabin for all deicing/anti-icing functions.

In some embodiments, during the deicing/anti-icing process emergency stop switches can be available both on location of the aircraft deicing/anti-icing process and for the remote operator to allow the deicing/anti-icing process to be paused or stopped. And, once the deicing/anti-icing process is completed, a final contamination check can be performed by local personnel to make sure the deicing/anti-icing process was completed satisfactorily.

This can be beneficial as, in this manner, the locally located technician can be specially trained in inspecting the aircraft and the remote operator can have specialized training in performing the deicing/anti-icing process. Other benefits can include: having the best operators available remotely to operate deice/anti-icers at any location; it may be easier to recruit, retain, and train operators; allows for these "virtual" staff to have cross-location mobility. Such systems can also create operating efficiencies, glycol and other chemical usage reductions, time savings, safety improvements, and reduction in local staff requirements, among other benefits.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 224 may reference element "24" in FIG. 2, and a similar element may be referenced as 324 in FIG. 3.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an example of a deicing/anti-icing rig used for deicing/anti-icing aircraft, in accordance with one or more embodiments of the present disclosure. The rig 100 includes a deicing/anti-icing truck 102, with a deicing/anti-icing control cabin 104, attached to the truck 102 by a boom 106. The back 108 of the truck includes containers that hold one or more substances that are applied to surfaces. The substances are pumped through lines 110 and out the nozzle 112. Lines 110 also include electrical and communication lines which allow an operator positioned in the deicing/anti-icing control cabin 104 to control the movement of the boom 106, the cabin 104, the movement of the nozzle 112, selection of the substance to be applied, and the rate at which it is applied. The substances can, for example, be deice/anti-icer, anti-icer, water and other substances that may be used during an aircraft deicing/anti-icing process.

Additionally, cameras 114 can be mounted in various places on the rig to provide a remote operator with a number of views from which to see the deicing/anti-icing process. For example, cameras can be mounted inside and/or outside the control cabin 104 and/or the truck 102.

Any suitable camera can be utilized. For example, some suitable camera types include: fixed cameras, movable cameras, 360 degree cameras, and/or variable field of view cameras, among others.

The rig can also include one or more sensors 116 to assist in avoiding collisions. For example, suitable sensors can include one or more cameras, sonar, radar, and/or lidar devices.

Such features can be beneficial in reducing or eliminating collisions of the rig and other objects including the aircraft being deice/anti-iced before, during, or after the deicing/anti-icing process. Sensors can also be placed on/in the boom or the truck to indicate how far out the boom is extended, the amount of horizontal rotation of the boom in relation to the truck, and/or vertical angle of the boom to the truck. This can be beneficial, as driving the rig with the boom extended or at a vertical or horizontal angle to the truck can be difficult, but may be desirable as the rig services an aircraft.

In order to accomplish embodiments of the present disclosure, the current type of deicing/anti-icing truck and control cabin will need to be modified to accommodate this new functionality. For example, hardware, such as communication hardware, cameras, and other sensors will need to be added to the rig to communicate to the remote portions of the deicing/anti-icing system. Additionally, software, to allow the remote components to access, communicate with, and control the rig will need to be installed in/on the rig.

Additionally, in some embodiments, all previously physically present controls and switches can be recreated virtually and appear on a display (touchscreen) within the truck or control cabin. Dispatch software can also be included in the rig. Dispatch software allows an operator to control which other operators can access the rig. This software can be stored in memory as executable instructions and data and the instructions can be executed by a processor of a computing device located in/on the rig.

A deicing/anti-icing system according to embodiments of the present disclosure includes the rig and a remote operator station. Examples of a remote operator stations are provided below in FIGS. 2 and 3.

Figure 2:
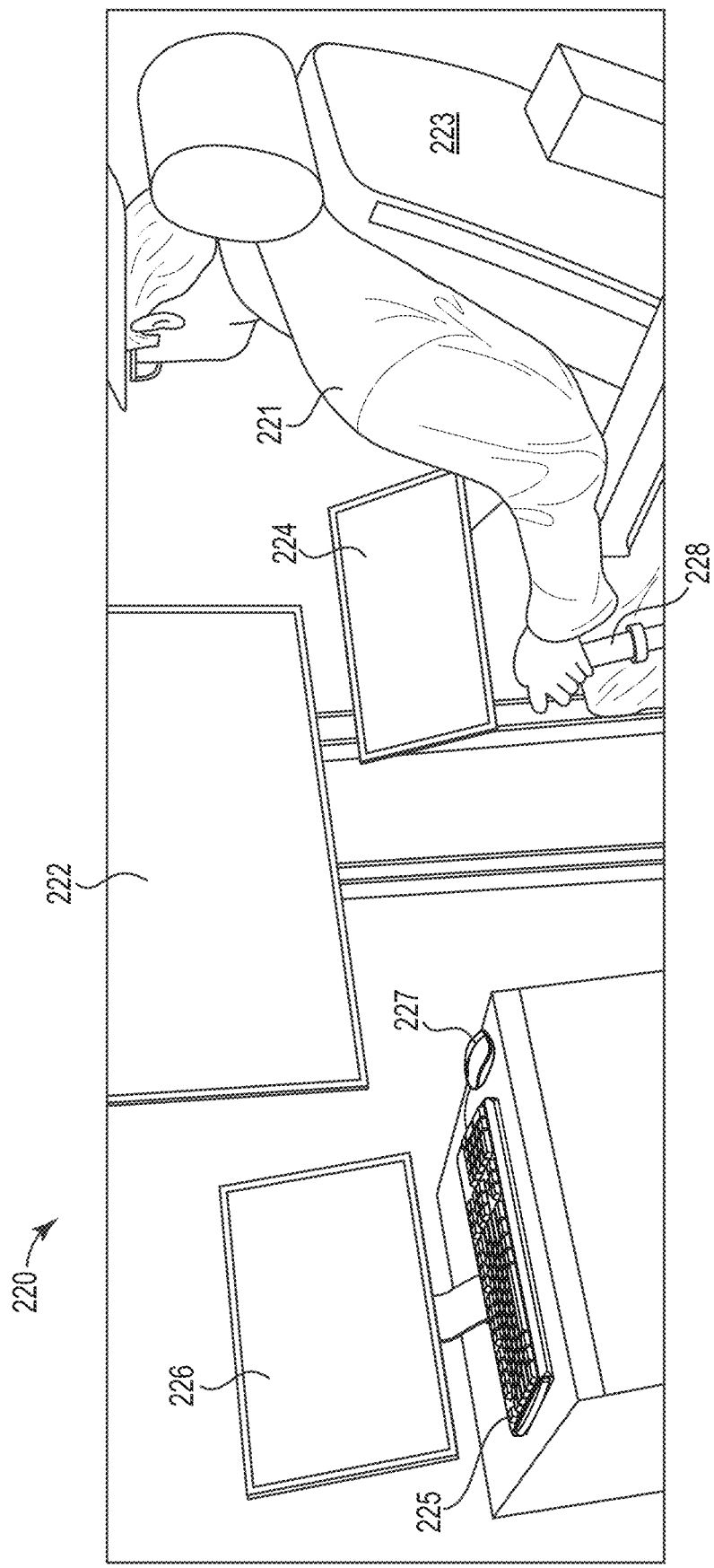
FIG. 2 is an illustration of an embodiment of a remote operator station of an aircraft deicing/anti-icing system, in accordance with one or more embodiments of the present disclosure.

FIG. 2 is an illustration of an embodiment of a remote operator station of an aircraft deicing/anti-icing system, in accordance with one or more embodiments of the present disclosure. As discussed above, to utilize embodiments of the present disclosure, significant modification of the hardware and software of a current vehicle design and development of both the remote operator station and systems used for communication between the two are necessary.

In the embodiment of FIG. 2, the remote operator station includes a number of displays 222, 224, 226 situated in front of a user 221 seated in a remote operator seat 223. The layout of the seat 223 and other components, such as one or more joysticks 228 can be arranged similarly to or identically to the layout of components in the control cabin (e.g., deicing/anti-icing control cabin 104 of FIG. 1).

Display 222 can be used, for example, to show the operator's view from the control cabin as if the remote operator was seated therein (e.g., created by one or more cameras 114 mounted on/in the control cabin 104 of FIG. 1) and/or one or more views from around the truck. In some embodiments, multiple display screens can be utilized (e.g., displays 422-1, 422-2, and 422-3 of FIG. 4), for example, with a display showing a view directly in front of the control cabin, another display showing a view to the right of the cabin, another display showing a view to the left of the cabin, and/or another display showing a view behind the cabin/truck, among other display configurations.

Embodiments can also provide sonar/radar/lidar imaging on one or more displays. Further, in some embodiments, a display may have its screen split to show a multitude of images on one display. This can be accomplished, for example, via software that assembles a mosaic of the images and presents them on the display. Additionally, in some embodiments, displays 224 and 226 can, for example, be used to display operational information about the rig and/or information about a deicing/anti-icing operation including multiple rigs.

In some embodiments, one display can include buttons, knobs, and/or switches that duplicate some or all of the buttons, knobs, and/or switches within the control cabin. These buttons/knobs/switches can control functions, such as, substance selection, flow rate of the substance, windshield wipers controls, turn on/off rig lights, among others. In some such embodiments, the content on this display can be a duplicate of or contain components of a corresponding display located in the control cabin. Either or both of these displays can be touchscreens, but user input could also be provided by other input mechanisms, such as, a keyboard 225 or mouse 227.

Figure 5:
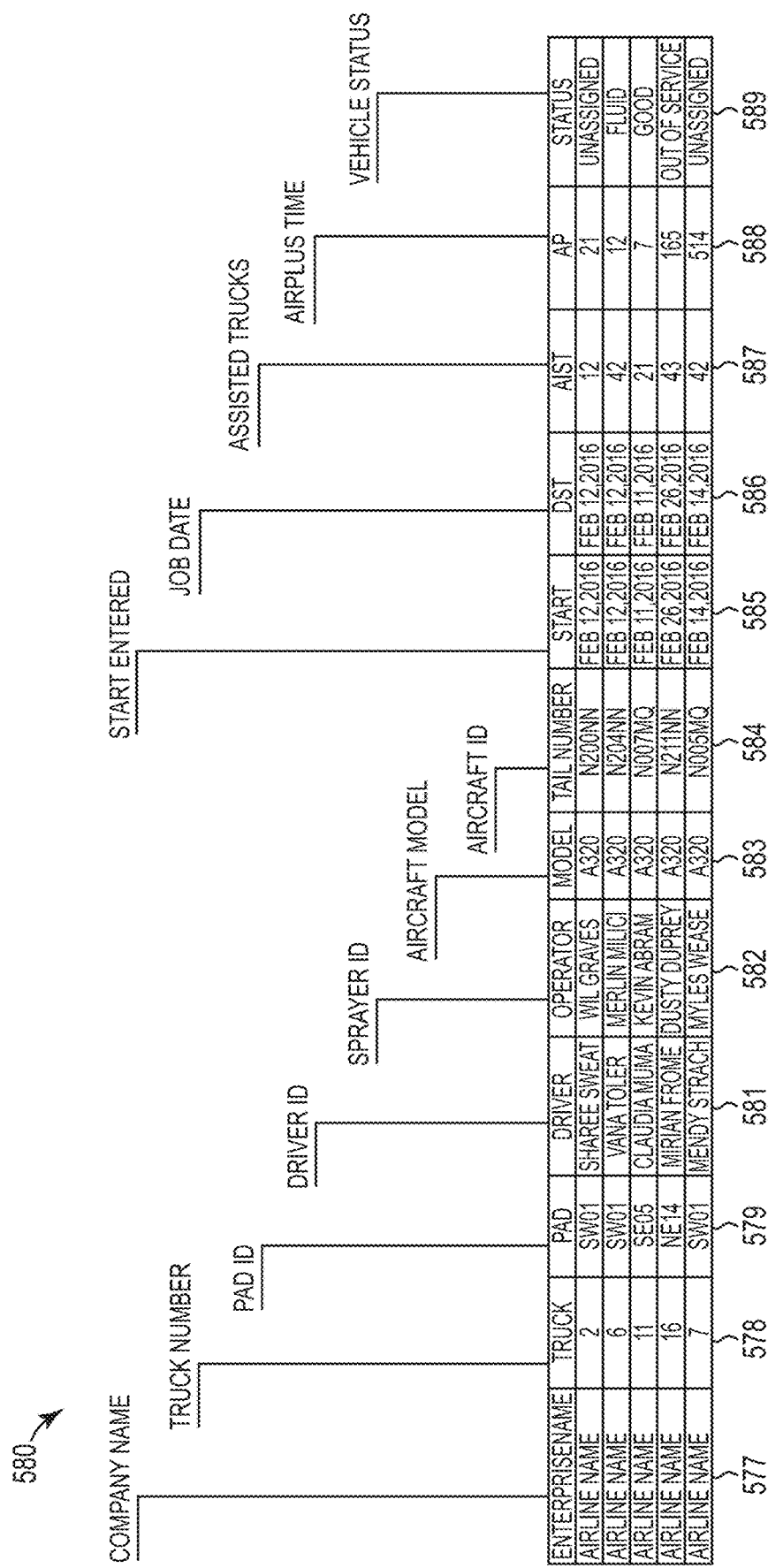
FIG. 5 is an illustration of some content viewable by a user on a display of the remote deicing/anti-icing system, generated in accordance with one or more embodiments of the present disclosure.
Figure 6:
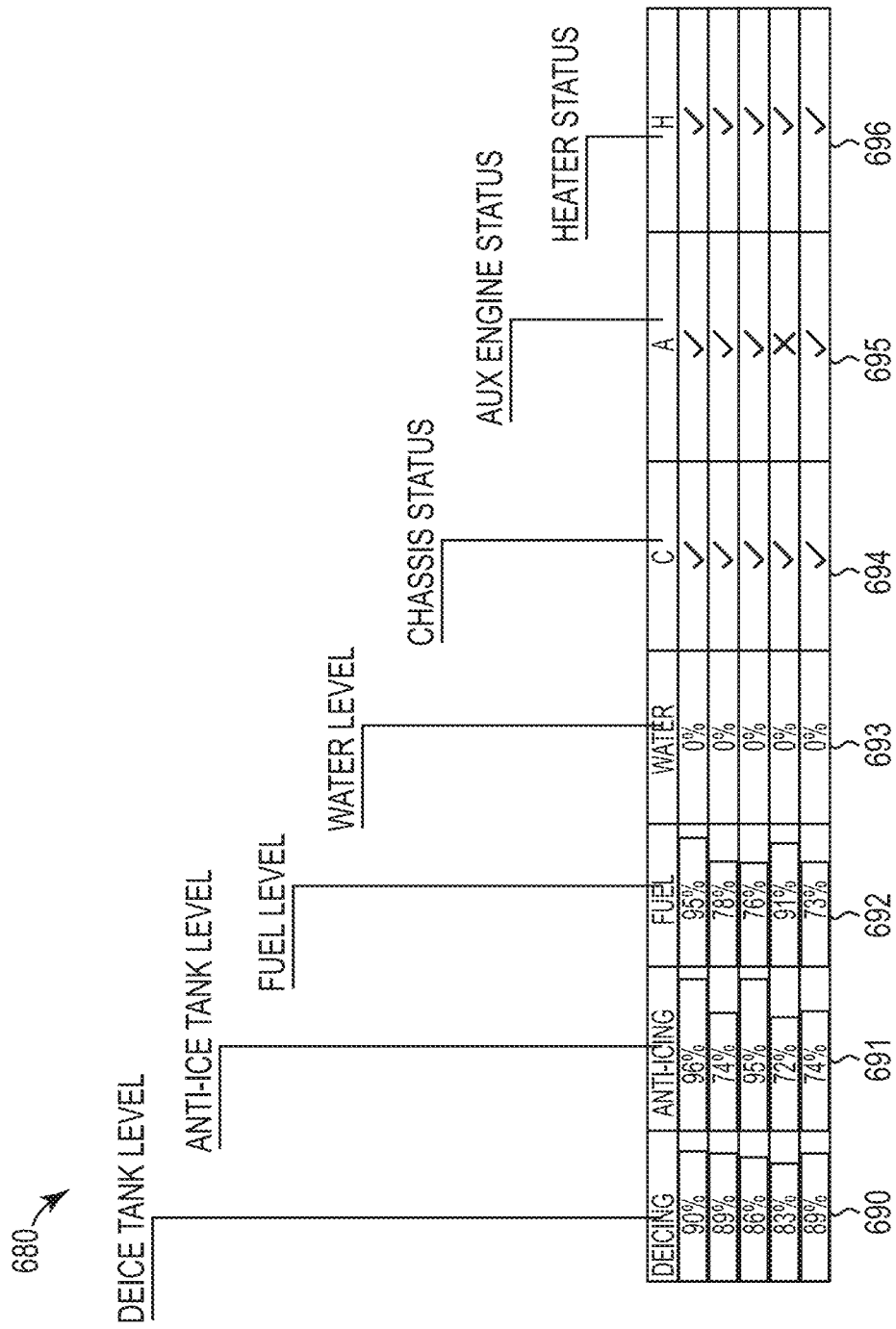
FIG. 6 is an illustration of some other content viewable by a user on a display of the remote deicing/anti-icing system, generated in accordance with one or more embodiments of the present disclosure.
Figure 7:
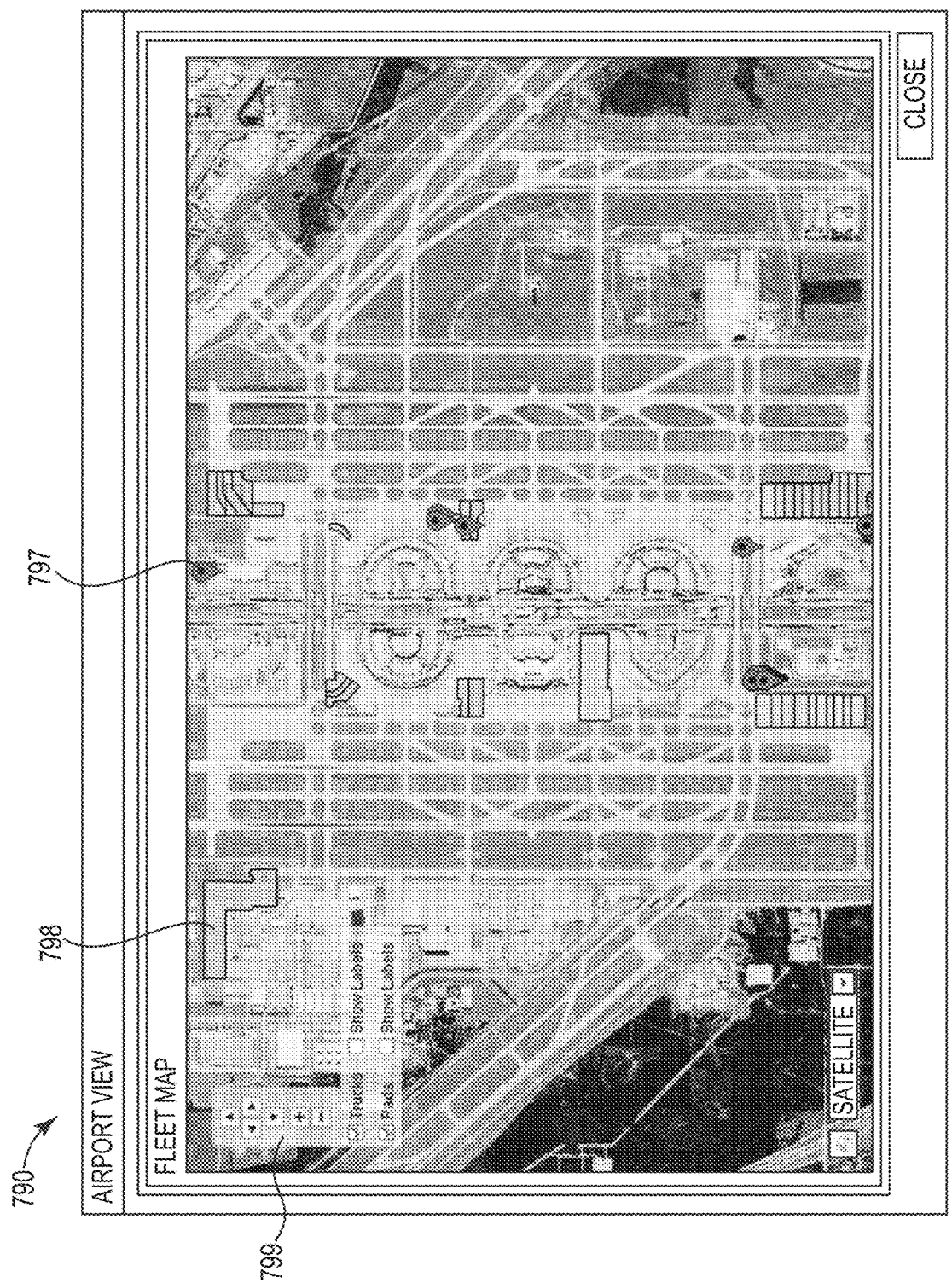
FIG. 7 is an illustration of a map of the airport viewable by a user on a display of the remote deicing/anti-icing system, generated in accordance with one or more embodiments of the present disclosure.

Another display (e.g., 224, 226) can include deicing/anti-icing system telemetry information. Examples of such information are shown in FIGS. 5-7. This can include information, such as data collected during a deicing/anti-icing process, rig substance levels, location of rig, information about the operator, identification information about the rig, and/or identifying information about the aircraft being deice/anti-iced, among other data.

Figure 3:
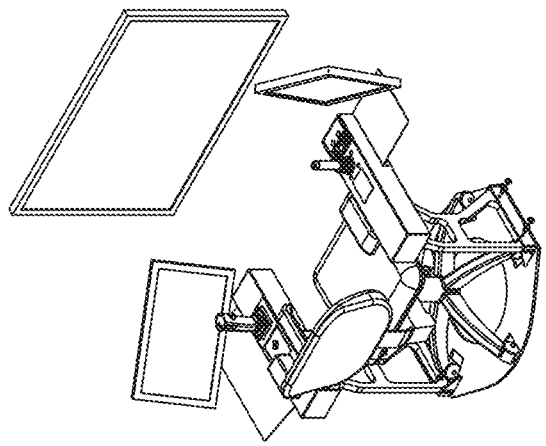
FIG. 3 is an illustration of another embodiment of a remote operator station of an aircraft deicing/anti-icing system, in accordance with one or more embodiments of the present disclosure.
Figure 3:
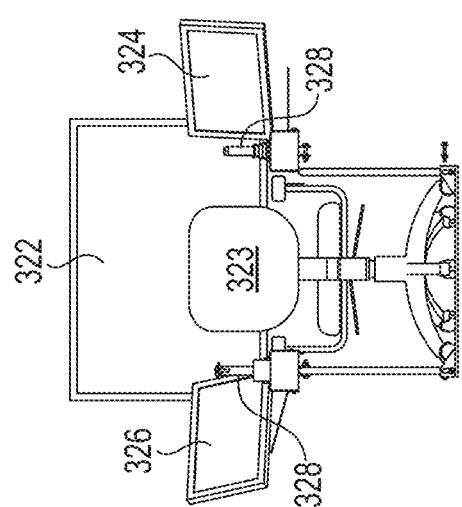
Figure 3:
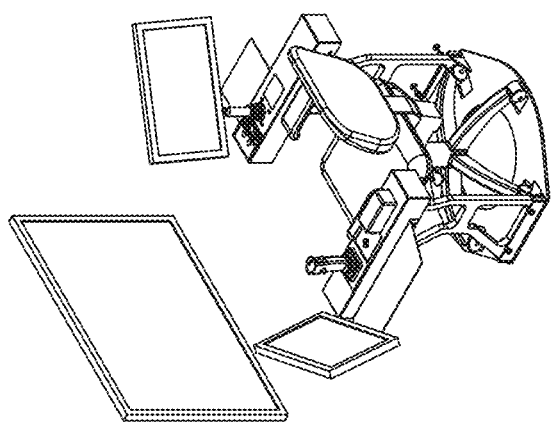

FIG. 3 is an illustration of another embodiment of a remote operator station of an aircraft deicing/anti-icing system, in accordance with one or more embodiments of the present disclosure. The embodiment of FIG. 3 is the exact same layout (not including display 322) as the layout of the deicing/anti-icing control cabin of the rig. For example, the control cabin and remote operator station have the same chair arms, with the same controls thereon, and the same displays 324 and 326.

As shown in FIG. 3, the chair arms of the remote operator station (and control cabin) also include a left joystick and a right joystick 328. One joystick (e.g., the right joystick) can, for example, control the nozzle movements, the nozzle flow shape (e.g., changing between a fan shape to a stream shape). The other joystick (e.g., the left joystick) can, for example, control the boom (horizontal rotation, amount of boom extension, amount of vertical rise) movement of the control cabin (can be rotated, for example 180 degrees), and/or control of the fly which is an extension at the end of the boom, among other functions.

In some embodiments, a user can make a selection via a user input device, such as the keyboard, mouse, or touchscreen, to enable one of the joysticks to allow control of the truck portion of the rig. For example, the operator can make a selection of a single operator mode on touchscreen display 326 and in that mode, the joystick (e.g., left joystick) allows driving forward and reverse, and allows steering left and right via movement of the joystick.

In such embodiments, the remote operator station can be equipped with an emergency interrupt switch (e.g., on the left arm near the joystick 328) which when activated (operator is incapacitated or is no longer in the operator seat 323) the control of the truck is interrupted and/or the parking brake is activated. This allows the remote operator to interrupt the deicing/anti-icing process or movement of the truck, remotely, when the system is in remote control mode. Additionally, in some implementations, an emergency interrupt switch can be provided in the rig, such that remote control of the rig can be interrupted.

In some embodiments of the present disclosure, the rig can be designed so that an operator can physically operate the truck locally by sitting in the driver's seat in the cab of the truck or can control the truck remotely via the remote operator station. This can be accomplished through control software at the remote operator station sending command instructions to control software at the rig that is executed to control hardware installed at the rig to perform specific functions, such as to turn the truck to the right.

In some embodiments of the present disclosure, the rig can be designed so that an operator can physically operate the deicing/anti-icing control cabin locally by sitting in the operator's seat of the control cabin or can control the control cabin remotely via the remote operator station. This can be accomplished through control software at the remote operator station sending command instructions to control software at the rig that is executed to control hardware installed at the rig to perform specific functions, such as to turn the control cabin to the right. In some embodiments, the remote operator station can control both the truck and the control cabin as discussed herein.

Embodiments can include a local observer control station. This can be a person on site at the location of the aircraft that is observing that the truck deice/anti-icer is functioning correctly and positioned correctly and verifying that the aircraft is free and clear of frozen contamination. The station can include an emergency stop switch that can control any truck deice/anti-icer under their control, view different video feeds from the trucks under their control, view data from the trucks (e.g., fluid levels, systems status, etc.), and communicate with the remote operator and communication components to allow the technician on site to communicate with a remote operator or a supervisor at a remote location that may, for example, be managing a number of local sites from a remote location.

Further, in various embodiments, every switch, control button, gauge, emergency stop, vehicle status, and function is controlled by a single touchscreen operator user interface. This will allow remote operation of existing hydraulic systems and control functions using the touchscreen. This may be the case at the remote operator station and, in some implementations, may also be the case in the rig. When located remotely, this will allow for the remote operator to actuate any switch, button, knob, or other component remotely. Further, in some embodiments, the operator cabin on the vehicle may be eliminated and all functionality can be controller by a remote operator or via the local observer control station.

Some such implementations of the present disclosure may have all traditionally physical switches, knobs, buttons, and other such user actuatable controls converted to virtual controls displayed on the touchscreen and actuated by the operator touching the touchscreen to modify a particular control setting. For example, a virtual switch can be depicted on the display and the operator can touch the touchscreen to actuate the switch rather than physically flipping the switch.

Figure 4:
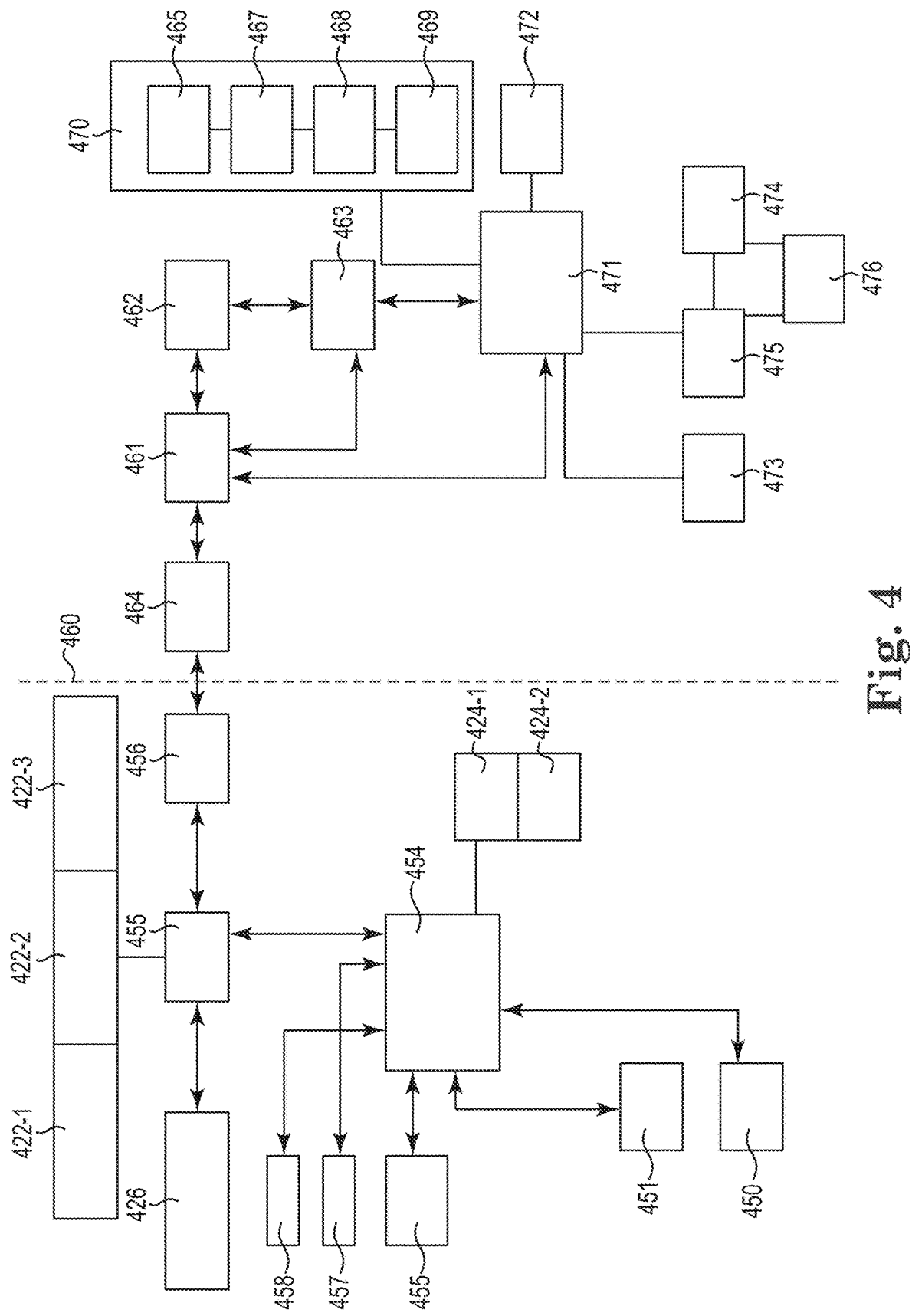
FIG. 4 is an illustration of a deicing/anti-icing system, in accordance with one or more embodiments of the present disclosure.

FIG. 4 is an illustration of a deicing/anti-icing system, in accordance with one or more embodiments of the present disclosure. FIG. 4 is a block diagram representation of various hardware and software components of a remote deicing/anti-icing system according to an embodiment of the present disclosure. FIG. 4 illustrates components of the rig on the right of line 460 and components of the remote operator station on the left of line 460.

The components of the rig in the embodiment illustrated in FIG. 4 include a communication device 464, such as a modem for communicating with the remote operator station and a computing device 461 with one or more processors and access to memory for storage of executable instructions and data for handling communication between the rig and the remote operator station. The components also include a global positioning system (GPS) device 462 for locating the rig within an airport complex and another computing device 463 that handles imaging data and image formatting to be provided to display within the rig and/or to the remote operator station. Other components can include another computing device 471 that receives and sends commands and data to the other components of the rig, such as, cabin controls 470, including those from the joysticks 467 and 468, display 469, and cabin controls 465 (e.g., virtual and/or physical switches, knobs, and buttons); rig controls 472; and sensor data regarding deicing/anti-icing 474, rig control 475, and telemetry 476.

The components of the remote operator station in the embodiment illustrated in FIG. 4 include a communication device 456, such as a modem for communicating with the remote operator station and a computing device 455 with processor and access to memory for storage of executable instructions and data for handling communication between the rig and the remote operator station. The components also include a computing device 455 for communicating information to and from the rig and for handling imaging data and image formatting to be provided to displays 422-1, 422-2, 422-3, 424-1, 424-2, and 426. The components also include a computing device 454, with a processor and access to memory, for handling communication with other station components, such as, the joysticks 457 and 458, virtual cabin controls 455, the telemetry software 451, and imaging/virtual environment software 450.

In operation, the truck can be operated locally by an operator close to the aircraft by operating the in vehicle controls 472. Those controls communicate with computing device 471 to provide for movement of the truck, actuation of lights, and other functions of the truck. The deicing/anti-icing control cabin can also be operated locally by an operator. This can be accomplished via the cabin controls 470. Those controls communicate with the computing device 471 to provide all functions of the control cabin, such as movement of the control cabin, movement of the nozzle, and/or adjustment of the stream, among other functions.

To remotely operate the truck and/or control cabin, the remote operator actuates the controls 455, 457, and 458. These components communicate with computing device 454 which communicates the instructions to the rig via communication device 456. The instructions are received by communication device 464 and are provided to computing device 471 for processing and execution to provide the remote operator directed functions by the truck.

The imaging/virtual environment software 450 provides the remote operator with an environment that makes the remote operator feel like they are sitting in the deicing/anti-icing control cabin and/or cab of the truck depending on what mode the system is set in by the operator (e.g., control cabin operation mode or truck operation mode, which selection can be provided to the operator via, for example, the imaging/virtual environment software 450). This software works in conjunction with the displays 422-1, 422-2, and 422-3 to offer a virtual view of either the control cabin or the cab of the truck, giving the remote operator a view as if they were physically seated in the control cabin or truck cab.

Further, the software can provide options to the display 426 or displays 424-1 and/or 424-2 that can be selected by the remote operator having to do with the remote user virtual experience, such as what mode to present on the displays 422 and image quality adjustments. It should be noted that although the remote operator station and the rig each are illustrated as having multiple computing devices, one computing device at each location could be used to accomplish the embodiments of the present disclosure, in some implementations. The various computing devices described herein can each include one or more processors and be associated with memory, either located in the computing device or accessible via a direct or network connection.

The memory can be any type of storage medium that can be accessed by the processor to provide the described functions and features of the various embodiments of the present disclosure. For example, the memory can be a non-transitory computer readable medium having computer readable instructions (e.g., executable instructions/computer program instructions) stored thereon that are executable by the processor in accordance with the present disclosure. The computer readable instructions can be executable by the processor to perform the features and functions described herein.

The memory can be volatile or nonvolatile memory. The memory can also be removable (e.g., portable) memory, or non-removable (e.g., internal) memory. For example, the memory can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory is illustrated as being located within the computing device, as noted above, embodiments of the present disclosure are not so limited. For example, memory can also be located internal to another computing resource (e.g., enabling computer readable instructions to be downloaded over the Internet or another wired or wireless connection).

The displays as described herein can be, for instance, a touchscreen (e.g., a graphical user interface can include touchscreen capabilities). Alternatively, a display can include a television, computer monitor, portable computing device screen (e.g., a tablet), other type of display device, or any combination thereof, configured to receive a video/image signal output.

As an additional example, a user interface can include a keyboard, mouse, or other user interface type that the operator can use to input information into remote operator system. Embodiments of the present disclosure, however, are not limited to a particular type(s) of user interface.

Provided below are some example embodiments of the present disclosure. In one example embodiment a remote operator deicing/anti-icing station is located in a remote location (e.g., in a room inside the airport, in a hangar, in a deicing/anti-icing provider facility, etc.) from a deicing/anti-icing rig (located on the tarmac of an airport, etc.). The embodiment includes a number of remote rig control components for actuation by a remote operator. These can include one or more touchscreens, keyboard, mouse, joysticks, etc. For example, a remote rig control component can include a remote operator user interface (e.g., touchscreen), located outside of a rig being at least partially controlled by the remote operator deicing/anti-icing station. The rig includes a truck and a deicing/anti-icing control cabin that controls disbursement of substances to deice/anti-ice an aircraft.

The remote operator deicing/anti-icing station embodiment also includes a communication device (e.g., a modem) that communicates instructions from the remote operator user interface and the number of remote rig control components to the rig to control at least one of the truck and the deicing/anti-icing control cabin. These instructions can, for example, be received by a modem at the rig and can then be forwarded directly to the components relevant to the received instructions that are being controlled or sent to a processor of a computing device that then directs the relevant components being controlled.

For instance, in some embodiments, the station includes a computing device having memory and a processor configured to execute executable instructions stored in the memory to receive inputs from the number of remote rig control components and communicate the inputs to the rig via the communication device.

In some embodiments, the station includes a computing device having memory and a processor configured to execute executable instructions stored in the memory to present views from one or more cameras mounted in or on the rig to one or more displays located at the remote operator deicing/anti-icing station. As discussed herein, various views can be provided and, in some implementations, the displays can be switched between displaying views from a perspective of an operator seated in the cab of the truck of the rig and views from a perspective of an operator seated in the deicing/anti-icing control cabin of the rig or both views can be presented to the remote operator at the same time (on different displays or portions of a display).

As discussed above, the one or more joysticks can have a variety of functions, such as controlling the movement of the truck and/or the movement of the deicing/anti-icing control cabin. This includes movement of the nozzle and changing its stream shape.

In another remote operator deicing/anti-icing station embodiment, the station includes a number of displays that display images (e.g., a video feed) received from one or more cameras on the deicing/anti-icing rig, a number of remote rig control components for actuation by a remote operator, and a communication device that communicates instructions from the remote operator user interface and the number of remote rig control components to the rig to control at least one of the truck and the deicing/anti-icing control cabin. In this example, the remote rig control components include a remote operator user interface provided on a first display, located outside of the deicing/anti-icing rig being at least partially controlled by the remote operator deicing/anti-icing station, the deicing/anti-icing rig including a truck and a deicing/anti-icing control cabin that controls disbursement of substances to deice/anti-ice an aircraft and a number of joysticks that allow the remote operator to control the movements of the truck or deicing/anti-icing control cabin.

As discussed with respect to FIG. 4, in some implementations the remote operator deicing/anti-icing station includes a number of displays that display sensor data received from one or more sensors on the deicing/anti-icing rig. This can, for example, be telemetry information, such as that shown in FIGS. 5 and 6 below, which can be collected from gas tank sensors, deicing/anti-icing substance tank sensors, or other sensors provided on the rig.

A remote operator deicing/anti-icing system embodiment also can include a remote operator deicing/anti-icing station located in a remote location from a deicing/anti-icing rig. The station has a number of remote rig control components for actuation by a remote operator. In this example, the remote rig control components include a remote operator user interface, located outside of a rig being at least partially controlled by the remote operator deicing/anti-icing station and a communication device that communicates instructions between the remote operator deicing/anti-icing station and the rig to control at least one of the truck and the deicing/anti-icing control cabin.

This system example also includes a deicing/anti-icing rig having a truck and a deicing/anti-icing control cabin that controls disbursement of substances to deice/anti-ice an aircraft. In order to communicate with the remote operator deicing/anti-icing station, the rig also has a communication device that communicates instructions between the remote operator deicing/anti-icing station and the rig to control at least one of the truck and the deicing/anti-icing control cabin.

Such systems can be designed such that the deicing/anti-icing control cabin and the remote operator deicing/anti-icing station each have an operator seat and an operator user interface and wherein the operator user interface of the deicing/anti-icing control cabin is located in the same position with respect to the operator seat in the deicing/anti-icing control cabin as is the remote operator user interface with respect to the operator seat in the remote operator deicing/anti-icing station.

It can also be the case, as described above, that the deicing/anti-icing control cabin and the remote operator deicing/anti-icing station each have an operator seat and at least one joystick and wherein the at least one joystick of the deicing/anti-icing control cabin is located in the same position with respect to the operator seat in the deicing/anti-icing control cabin as is the at least one joystick with respect to the operator seat in the remote operator deicing/anti-icing station. In these example layouts, an operator that is familiar with the layout of the deicing/anti-icing control cabin or the remote operator deicing/anti-icing station can easily adapt to the other, thereby requiring less training time.

In some system embodiments, the remote operator station includes a computing device having memory and a processor configured to execute executable instructions stored in the memory to provide telemetry information about the rig being controlled by the remote operator deicing/anti-icing station on a display located at the remote operator deicing/anti-icing station. In some such embodiments, the system can provide telemetry information regarding other rigs (e.g., those not being controlled by the remote operator deicing/anti-icing station), as described herein.

Additionally, in some implementations, executable instructions can be provided such that map information about the location of the rig being controlled by the remote operator deicing/anti-icing station can be displayed on a display located within the remote operator deicing/anti-icing station. In some embodiments, this can include weather information and/or geofencing information and/or capabilities.

In a computer implemented method example, the method can include generating, via a computing device having a processor and memory, at least one image constructed from image data received from a camera in a deicing/anti-icing rig, the deicing/anti-icing rig having a truck and a deicing/anti-icing control cabin, presenting the constructed image on a display within a remote operator deicing/anti-icing station, receiving at least one truck control input or deicing/anti-icing control cabin input from one or more remote rig control components of the remote operator deicing/anti-icing station, and sending the received at least one truck control inputs or deicing/anti-icing control cabin inputs to the rig to control at least one of the truck or the deicing/anti-icing control cabin.

With regard to providing map information and geofencing features, a method embodiment could include, for example, presenting map information about the location of the rig being controlled by the remote operator deicing/anti-icing station on a display located within the remote operator deicing/anti-icing station. The method can also include providing an operator selectable geofencing interface on a display located within the remote operator deicing/anti-icing station that allows an operator to select one or more locations that remote control of at least one of the truck or the deicing/anti-icing control cabin are authorized. And, in some embodiments, providing an operator selectable geofencing interface on a display located within the remote operator deicing/anti-icing station that allows an operator to select one or more locations that remote control of at least one of the truck or the deicing/anti-icing control cabin are restricted.

FIG. 5 is an illustration of some content viewable by a user on a display of the remote deicing/anti-icing system, generated in accordance with one or more embodiments of the present disclosure. The information shown in FIGS. 5 and 6 is information from a deicing/anti-icing telemetry system that shows the status of multiple rigs at one or more locations and allows a remote operator to act as a dispatcher to monitor progress of the multiple rigs and make aircraft deicing/anti-icing or resupply decisions that can be communicated to remote and/or local operators either operating the trucks or control cabins or supervising the operations. The telemetry system that allows deicing/anti-icing providers to view real time truck data, employee performance, employee project assignments, and historical logs, among other data.

The providers can also assign and dispatch remote operator employees to remote operated rigs. In this manner, a particular remote operator at a remote operator station can be controlling a first rig (e.g., rig #21 in Minneapolis) and once that deicing/anti-icing project is completed, can be assigned a new rig (e.g., rig #3 in Denver) and begin controlling that rig. All of these assignments can be controlled and tracked via telemetry software 451 in FIG. 4, for example, which can be displayed and controlled via displays 424-1, 424-2, or 426 (e.g., if they are touchscreens).

Such a system allows for the remote operator to view live data, deicing/anti-icing data, and employee performance for their station and/or other stations. In some embodiments, this system can include weather data. The information provided by the system can be split onto more than one display. For example, rig status can be provided on display 426 and weather information can be provided on display 424-1.

In the embodiment of FIG. 5, the telemetry software 580 provides company name 577 of the aircraft being serviced, truck identifier 578, deicing/anti-icing process location 579 (pad ID), truck operator identifier 581, control cabin operator identifier 582, aircraft model 583, aircraft identifier 584, date and/or time job was started 585, date and/or time job was assigned, other rigs that assisted 587, experience of control cabin operator 588, vehicle status 589.

In addition to the dispatch and monitoring functions this information can provide, items such as the above can, for example, be used for audit purposes to identify a particular one or more operators working on aircraft for a particular airline, aircraft of a specific type (e.g., if a particular aircraft requires a specific deicing/anti-icing procedure), in assigning operators that have worked together before, operators that worked on a specific aircraft, among other uses for such data.

FIG. 6 is an illustration of some other content viewable by a user on a display of the remote deicing/anti-icing system, generated in accordance with one or more embodiments of the present disclosure. In this embodiment, the telemetry information provided to the remote operator include levels of the different substances that can be provided through the nozzle, namely, deice/anti-ice tank level 690, anti-ice tank level 691, and water level 693. The system also provides fuel level 692 and other status items (694, 695, and 696) that can be useful in determining if a rig can continue to perform service or if it needs to be decommissioned or resupplied.

FIG. 7 is an illustration of a map of the airport viewable by a user on a display of the remote deicing/anti-icing system, generated in accordance with one or more embodiments of the present disclosure. As discussed previously with respect to FIG. 4, in some embodiments, the rig can include a GPS device or other geolocation technology to locate the rig. The GPS device can, for example, be used to locate the rig within an airport complex. An example of such a location system 790 is illustrated in FIG. 7.

In this example, icons 797 represent the locations of different rigs and the areas 798 denote deicing/anti-icing pads or resupply/garage areas for the deicing/anti-icing operations. In some implementations, such a system can also be equipped with a geofencing capability. For example, when dispatching a rig to a particular deicing/anti-icing pad, an operator of this geofencing system can enable remote control of the rig only in designated areas (e.g., only when the rig 797 is within the area defined as deicing/anti-icing pad 798). If outside the pad area, the rig can only be operated by a local operator. This feature can increase the safety of such remote operator systems as the remote operator can not operate the rig in more unfamiliar areas that may have other moving objects to contend with.

Through use of the embodiments disclosed herein, deicing/anti-icing providers may be able to dramatically reduce or eliminate the need to hire operators at each airport. Deicing/anti-icing providers and/or airlines will be able to utilize a group of highly trained operators to remotely operate their deicing/anti-icing trucks at all locations. This could reduce the total number of employees required system-wide by 75-90% and allow their employees to be better trained and more experienced, among other benefits.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A remote operator deicing/anti-icing station located in a remote location from a deicing/anti-icing rig, comprising:

a number of remote rig control components for actuation by a remote operator, wherein the remote rig control components include:
  a remote operator user interface, located outside of a rig being at least partially controlled by the remote operator deicing/anti-icing station, the rig including a truck and a deicing/anti-icing control cabin that controls disbursement of substances to deice/anti-ice an aircraft;
  a communication device that communicates instructions from the remote operator user interface and the number of remote rig control components to the rig to control the truck and the deicing/anti-icing control cabin; and
  wherein the remote operator user interface allows a user to switch between control of the truck from a visual perspective from a cab of the truck and control of the deicing/anti-icing control cabin from a visual perspective from the deicing/anti-icing control cabin.

2. The remote operator deicing/anti-icing station of claim 1, wherein the station includes a computing device having memory; and
  a processor configured to execute executable instructions stored in the memory to:
    present views from one or more cameras mounted in or on the rig to one or more displays located at the remote operator deicing/anti-icing station.

3. The remote operator deicing/anti-icing station of claim 2, wherein the presented views are from a perspective of an operator seated in the control cabin of the rig.

4. The remote operator deicing/anti-icing station of claim 2, wherein the presented views are from a perspective of an operator seated in a cab of the truck of the rig.

5. The remote operator deicing/anti-icing station of claim 1, wherein the station includes a computing device having memory; and
  a processor configured to execute executable instructions stored in the memory to:
    receive inputs from the number of remote rig control components and communicate the inputs to the rig via the communication device.

6. The remote operator deicing/anti-icing station of claim 1, wherein the number of remote rig control components include at least one joystick that controls the movement of the truck.

7. The remote operator deicing/anti-icing station of claim 1, wherein the number of remote rig control components include at least one joystick that controls the movement of the deicing/anti-icing control cabin.

8. The remote operator deicing/anti-icing station of claim 1, wherein the number of remote rig control components include at least one joystick that controls the movement of a boom connecting the truck to the deicing/anti-icing control cabin.

9. A remote operator deicing/anti-icing system, comprising:
  a remote operator deicing/anti-icing station located in a remote location from a deicing/anti-icing rig, comprising:
    a number of remote rig control components for actuation by a remote operator, wherein the remote rig control components include:
      a remote operator user interface, located outside of a rig being at least partially controlled by the remote operator deicing/anti-icing station; and
      a first communication device that communicates instructions between the remote operator deicing/anti-icing station and the rig to control a truck and a deicing/anti-icing control cabin; and
      wherein the remote operator user interface allows a user to switch between control of the truck from a visual perspective from a cab of the truck and control of the deicing/anti-icing control cabin from a visual perspective from the deicing/anti-icing control cabin; and
  a deicing/anti-icing rig including:
    the truck; and
    the deicing/anti-icing control cabin that controls disbursement of substances to deice/anti-ice an aircraft; and
  a second communication device that communicates instructions between the remote operator deicing/anti-icing station and the rig to control the truck and the deicing/anti-icing control cabin.

10. The system of claim 9, wherein the deicing/anti-icing control cabin and the remote operator deicing/anti-icing station each have an operator seat and an operator user interface and wherein the operator user interface of the deicing/anti-icing control cabin is located in the same position with respect to the operator seat in the deicing/anti-icing control cabin as is the remote operator user interface with respect to the operator seat in the remote operator deicing/anti-icing station.

11. The system of claim 9, wherein the deicing/anti-icing control cabin and the remote operator deicing/anti-icing station each have an operator seat and at least one joystick and wherein the at least one joystick of the deicing/anti-icing control cabin is located in the same position with respect to the operator seat in the deicing/anti-icing control cabin as is the at least one joystick with respect to the operator seat in the remote operator deicing/anti-icing station.

12. The system of claim 9, wherein the remote operator station includes a computing device having memory; and
  a processor configured to execute executable instructions stored in the memory to:
    provide telemetry information about the rig being controlled by the remote operator deicing/anti-icing station on a display located at the remote operator deicing/anti-icing station.

13. The system of claim 9, wherein the remote operator station includes a computing device having memory; and
  a processor configured to execute executable instructions stored in the memory to:
    provide telemetry information about a number of rigs not being controlled by the remote operator deicing/anti-icing station on a display located at the remote operator deicing/anti-icing station.

14. The system of claim 9, wherein the remote operator station includes a computing device having memory; and
  a processor configured to execute executable instructions stored in the memory to:
    provide map information about the location of the rig being controlled by the remote operator deicing/anti-icing station on a display located within the remote operator deicing/anti-icing station.

15. A computer implemented method for remote deicing/anti-icing of an aircraft, comprising:
  generating, via a computing device having a processor and memory, at least one image constructed from image data received from a camera in a deicing/anti-icing rig, the deicing/anti-icing rig having a truck and a deicing/anti-icing control cabin;

presenting the constructed image to a remote user interface, used to control the deicing/anti-icing rig, on a display within a remote operator deicing/anti-icing station;

receiving at least one truck control input or deicing/anti-icing control cabin input from one or more remote rig control components of the remote operator deicing/anti-icing station;

sending the received at least one truck control inputs or deicing/anti-icing control cabin inputs to the rig to control the truck or the deicing/anti-icing control cabin; and wherein the remote operator user interface allows a user to switch between control of the truck from a visual perspective from a cab of the truck and control of the deicing/anti-icing control cabin from a visual perspective from the deicing/anti-icing control cabin.

16. The method of claim 15, wherein the method includes presenting map information about the location of the rig being controlled by the remote operator deicing/anti-icing station on a display located within the remote operator deicing/anti-icing station.

17. The method of claim 15, wherein the method includes providing an operator selectable geofencing interface on a display located within the remote operator deicing/anti-icing station that allows an operator to select one or more locations that remote control of the truck or the deicing/anti-icing control cabin are authorized.

18. The method of claim 15, wherein the method includes providing an operator selectable geofencing interface on a display located within the remote operator deicing/anti-icing station that allows an operator to select one or more locations that remote control of the truck or the deicing/anti-icing control cabin are restricted.

19. A remote operator deicing/anti-icing station located in a remote location from a deicing/anti-icing rig, comprising:

a number of displays that display images received from one or more cameras on the deicing/anti-icing rig;

a number of remote rig control components for actuation by a remote operator, wherein the remote rig control components include:

a remote operator user interface provided on a first display, located outside of the deicing/anti-icing rig being at least partially controlled by the remote operator deicing/anti-icing station, the deicing/anti-icing rig including a truck and a deicing/anti-icing control cabin that controls disbursement of substances to deice/anti-ice an aircraft;

a number of joysticks that allow the remote operator to control the movements of the truck or deicing/anti-icing control cabin; and a communication device that communicates instructions from the remote operator user interface and the number of remote rig control components to the rig to control the truck and the deicing/anti-icing control cabin; and wherein the remote operator user interface allows a user to switch between control of the truck from a visual perspective from a cab of the truck and control of the deicing/anti-icing control cabin from a visual perspective from the deicing/anti-icing control cabin.

20. The remote operator deicing/anti-icing station of claim 19, wherein the remote operator deicing/anti-icing station includes the number of displays that display sensor data received from one or more sensors on the deicing/anti-icing rig.

* * * * *